Dec. 26, 1967 F. A. COMERCI ET AL 3,360,614

SHUNTED MAGNETIC RECORDING HEAD

Filed Sept. 19, 1963

INVENTORS
FRANK A. COMERCI
FRANK A. SLAKER
BY Carpenter, Abbott, Coulter & Kinney
ATTORNEYS

United States Patent Office 3,360,614
Patented Dec. 26, 1967

3,360,614

SHUNTED MAGNETIC RECORDING HEAD

Frank A. Comerci, Stamford, and Frank A. Slaker, Norwalk, Conn., assignors to Minnesota Mining and Manufacturing Company, St. Paul, Minn., a corporation of Delaware Filed Sept. 19, 1963, Ser. No. 310,004
2 Claims. (Cl. 179—100.2)

ABSTRACT OF THE DISCLOSURE

A magnetic transducer for recording and reproducing, the pole pieces of which are made of material of high permeability, high coercivity and low electrical conductivity, e.g., a ferrite, having a magnetic shunt consisting of a lamina of a high permeability, low coercivity metal such as mumetal overlaid on the pole piece in such a way as to prevent remanent magnetization in the high coercivity pole pieces from producing noise signals when the movement of materials in the environment of the transducer causes changes in reluctance.

Figure 1:
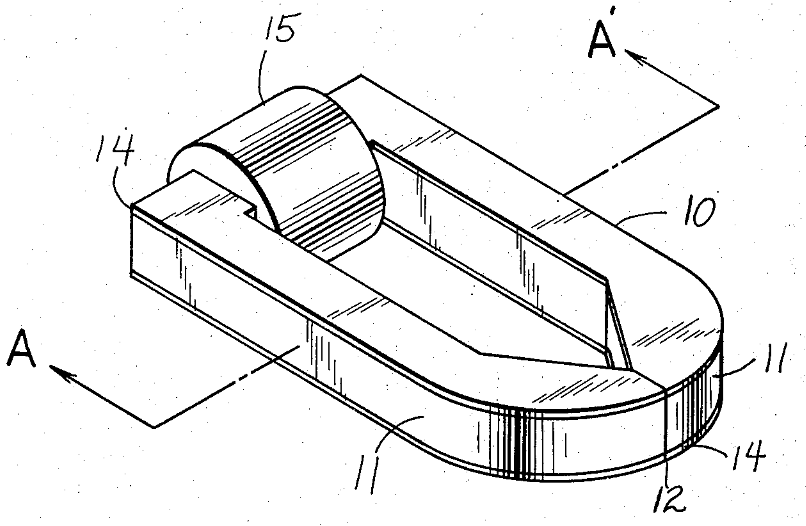

This invention relates to magnetic transducers and more particularly to pole pieces for use in magnetic transducers which are subjected to varying environmental conditions.

Magnetic transducers which are especially useful for recording and reproducing high frequencies desirably have cores consisting of pole pieces made of material of high permeability, low coercivity and low electrical conductivity to reduce losses at these frequencies. Heretofore, however, practically useful pole pieces of this type have not been available because the presently accessible magnetic materials have either high permeability, low coercivity, and high electrical conductivity, such as mumetal, or have relatively lower permeability, higher coercivity, and low conductivity, such as ferrites. At low frequencies, the former materials operate satisfactorily; however, at high frequencies the losses (primarily eddy current) become excessive, and one is compelled to use the higher resistance materials even though they exhibit undesirably low permeability and excessive coercivity.

All magnetic transducer cores or pole pieces retain some undesirable remanent magnetism after use, the exact value being dependent upon the magnetic conditions last experienced by the device in recording or playback. The ferrite materials especially, owing to their relatively high coercivity, exhibit a high remanent magnetization. As a result, if there is a change in the reluctance of the magnetic circuit this remanent magnetization will be modulated and a signal will be generated in the coil which is a part of the transducer. Such a change in reluctance can be caused by motion of magnetic materials close enough to the poles of the transducer to influence the magnetic circuit. The changes in reluctance produce noise in the system on playback or recording.

It has heretofore been sought to eliminate or minimize noise caused by changes in the reluctance of the pole pieces because of external influences, by placing magnets at a point where their field cancels the remanent magnetization in the transducer. However, because the amount of remanent magnetism in the transducer pole pieces depends upon the unpredictable magnetic intensity of the last signal experienced by the transducer, it is substantially impossible to eliminate such noise completely by means heretofore available to the art.

It is an object of this invention to provide means for magnetically shunting the core of a magnetic transducer to short circuit any residual magnetization in the transducer poles. It is another object of the invention to provide ferrite transducer cores having improved resistance to external magnetic influences. Other objects of the invention will be apparent from the disclosures hereinafter made.

In accordance with the above and other objects of the invention, it has been found that when ferrite transducer cores are provided with a laminate of a material of high permeability and low coercivity which is overlaid on, in close contact with and coextensive with at least one complete side throughout the circumferential length of the said cores, any remanent magnetization in the relatively high coercivity ferrite poles will be effectively shunted by the high permeability lamina so as to produce no signal in the coil of the transducer which is occasioned by the movement of materials in the environment of the transducer causing changes in reluctance. However, at the frequencies at which recording takes place of signals ordinarily recorded upon magnetic record media, the ferrite core is capable of operating in a normal fashion without interference from the shunting material. In fact, the shunt improves the performance of the transducer at lower frequencies owing to its better magnetic characteristics.

Figure 2:
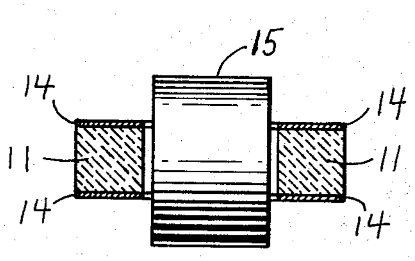

The invention will be further understood by reference to the accompanying drawing, in which FIGURE 1 shows a ring head type transducer provided with a core having the magnetic shunt according to the invention in enlarged, isometric view, and FIGURE 2 is a cross-section taken through FIGURE 1 along the line A, A'.

Referring to FIGURE 1, transducer 10 is provided with a core consisting of pole pieces 11 of ferrite, on which are overlaid relatively thin magnetic shunt layers 14, e.g., of mumetal. The pole pieces extend into the coil and are tightly butted together. The usual gap 12 is provided. Each shunting layer is coextensive with and in contact with the entire side of the pole piece on which it is overlaid. Thus, the shunt extends over the entire magnetic circuit. The shunted pole pieces pass through a conventional coil 15. Alternatively, the core is made in one piece, thus eliminating joints other than the magnetic recording gap.

FIGURE 2 shows the transducer in cross-section, the shunting layers 14 of mumetal being shown in intimate contact with the pole pieces 11. They are preferably bonded or adhered to the ferrite core.

As an alternative construction, the shunting layer 14 of FIGURE 2 can be continued around the pole pieces, to enclose them completely. In each case, the magnetic circuit is shunted throughout its length.

To avoid excessive eddy current losses, the sheets of mumetal are relatively thin, from about 0.5 to 5 mils in thickness being preferred.

In operation, the transducer is employed in the same way as any conventional transducer, with the exception that external secondary or bucking fields are not required.

Devices embodying the concept of the invention are useful not only in magnetic transducers, but also in other devices which employ ferrite cores, such as tuned inductors, which may have cores with remanent magnetization. In these instances also, the effect of change in the external environment of the ferrite core is minimized.

Ferrite materials which are useful for the pole pieces according to the invention are the magnetic ferrites commonly employed for the purpose.

The metals which can be employed for providing the shunt are exemplified by mumetal (alloy of about 74% nickel, 20% iron, 5.3% copper and 0.7% manganese); alfenol (an alloy of 12–16% aluminum and 88–84% iron), and the like.

What is claimed is:

1. In a core for magnetic transducers, in combination, a pole piece composed essentially of magnetic material having permeability and conductivity characteristics suitable for recording high frequency signals without substantial loss and free from detrimental coercivity characteristics, and overlaid on at least one side of said pole piece which side extends into the coil of said transducer, in close contact and coextensive therewith over the entire length thereof, a magnetic shunt consisting of a thin sheet of magnetic material of high direct current permeability, low coercivity and low internal electrical resistance.

2. In a pole piece for magnetic transducers, in combination, a pole piece composed essentially of a magnetic ferrite, and overlaid on and in close contact therewith and coextensive with at least one side of said pole piece which extends into the coil of said transducer and over the entire length thereof, a magnetic shunt consisting of a thin sheet of mumetal.

References Cited

UNITED STATES PATENTS

| | | | |
|---|---|---|---|
| 2,711,945 | 6/1955 | Kornei | 346—74 |
| 2,850,582 | 9/1958 | Raemy | 179—100.2 |
| 3,303,292 | 2/1967 | Bedell et al. | 179—100.2 |

BERNARD KONICK, *Primary Examiner.*

A. I. NEUSTADT, *Assistant Examiner.*